US006783268B2

(12) United States Patent
Aynie et al.

(10) Patent No.: US 6,783,268 B2
(45) Date of Patent: Aug. 31, 2004

(54) INDICATOR LAMP WITH SIMPLIFIED OPTICAL STRUCTURE (75) Inventors: Jean Pierre Aynie, Bobigny Cedex (FR); Jean Dera, Bobigny Cedex (FR); Jean Claude Gasquet, Bobigny Cedex (FR); Ghislain Lefevre, Bobigny Cedex (FR); Filipe Videira, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 09/940,981

(22) Filed: Aug. 28, 2001

(65) Prior Publication Data
US 2003/0123260 A1 Jul. 3, 2003

(30) Foreign Application Priority Data
Aug. 28, 2000 (FR) .............................. 00 11003

(51) Int. Cl.$^7$ ............................................. F21V 13/02
(52) U.S. Cl. ...................... 362/544; 362/522; 362/240; 362/244
(58) Field of Search ................................. 362/240, 522, 362/521, 235, 223–225, 246, 244, 311, 543, 544, 545, 800

(56) References Cited
U.S. PATENT DOCUMENTS 4,733,335 A    3/1988  Serizawa et al.
4,859,043 A    8/1989  Carel et al.
5,490,049 A  * 2/1996  Montalan et al. ........... 362/240
6,012,831 A  * 1/2000  Maekawa ................... 362/546
6,170,971 B1   1/2001  Godbillon ................... 362/543

FOREIGN PATENT DOCUMENTS

FR    2207473     6/1974
FR    2614969    11/1988
FR    2 776 595   6/2000

* cited by examiner

Primary Examiner—Alan Cariaso
Assistant Examiner—Guiyoung Lee
(74) Attorney, Agent, or Firm—Morgan & Finnegan, LLP

(57) ABSTRACT

An indicator lamp for a motor vehicle includes a plurality of light sources, and a plurality of linking elements. The lamp includes components that straighten out the light emitted by the light sources so that the light is propagated in a direction essentially parallel to a general direction of emisssion. These components include multiple first elements and a second element. East first element corresponds to one of the plurality of light sources. The first elements are able to distribute the light in a plane essentially perpendicular to the general direction of emission, in an essentially uniform way onto the second element. The second element is able to straighten out the incident light towards the general direction of emission.

24 Claims, 4 Drawing Sheets

INDICATOR LAMP WITH SIMPLIFIED OPTICAL STRUCTURE

FIELD OF THE INVENTION

The present invention relates to indicator lamps especially for motor vehicles.

BACKGROUND OF THE INVENTION

It applies in particular to the indicator lamps of the "third stop light" type, that is to say braking-indicator lamps, which can be mounted within the passenger compartment of the vehicle, against the rear window of the vehicle, or be integrated into slim appendages situated at the rear of the vehicle, such as aerodynamic spoilers or ailerons.

The first lamps of this type exhibited the drawback of providing non-uniform illumination, despite the devices used for spreading the light, which generally consisted of balls or rings integrated into the enclosing glazing or into an optical plate of the lamp situated downstream of the light source. This drawback, although it is generally tolerable from the point of view of the regulations and of the photometry, is prejudicial from the aesthetic point of view, which is becoming increasingly important nowadays.

A single-source lamp is known, for example from the document FR-A-2 614 969, the illumination from which is uniform. This lamp comprises, in a housing, a transparent or translucent optical screen, more usually called "lens" or "balloon", interposed between a single light source and an essentially flat optical plate and extending in a direction perpendicular to the optical axis of the lamp. The particular geometric configuration of the lens ensures that the surface density of luminous flux arriving on the plate is essentially constant over the entire surface of this plate. Moreover, the surface of the plate is provided with striations straightening out the light rays originating from the lens so as to transmit to the outside a beam situated in the solid angle intended by the regulations.

However, motor-vehicle constructors currently want to be able to use third stop lights at least one of the dimensions of which, for example the width, is relatively large, and which employ a plurality of light sources such as light-emitting diodes. One solution to this problem consists, according to the document FR-A-2 776 595, in producing a device consisting of the combination of optical subassemblies as described in the document FR-A-2 614 969, and exhibiting uniform illumination within each subassembly.

The document FR-A-2 776 595 provides for several light sources to be used, and, for each light source, a hemispherical lens distributing the light uniformly in a plane essentially perpendicular to the general direction of emission, onto a second, generally plate-shaped, element able to straighten out the incident light towards the general direction of emission, and, at the transition between two adjacent plate-shaped elements, at least one striation is provided which is capable of straightening out, towards the general direction of emission, the light originating from two adjacent light sources each associated with one lens and with one plate-shaped element.

Such a design gives satisfaction on the photometric front, but remains capable of improvement, especially as regards its mechanical construction. This is because the various components, such as the light sources, the hemispherical lenses and the plates, are mounted on a support structure. It results therefrom that the construction or the assembling of such an indicator lamp constitutes a relatively intricate operation, which it is very difficult to automate. Moreover, slight variations in the respective positions of the various optical components, resulting from their respective manufacturing tolerances, have the consequences of substantial variations in the photometric qualities of the resulting beam.

SUMMARY OF THE INVENTION

The present invention is placed in this context, and its object is to propose an indicator lamp using several light sources, which is simple to assemble, the photometric qualities of which are constant from one lamp to another, and which is inexpensive.

Hence the subject of the present invention is an indicator lamp for a motor vehicle comprising a plurality of light sources and optical processing means able to straighten out the light emitted by the light sources so that it is propagated in a direction essentially parallel to a general direction of emission, the optical processing means comprising, in association with each source, a first element able to distribute the light in a plane essentially perpendicular to the general direction of emission, in an essentially uniform way onto a second, generally plate-shaped, element able to straighten out the incident light towards the said general direction of emission.

According to the present invention, linking elements are arranged between first adjacent elements and between the first elements and the second element, and the first element, the second element and the linking elements are made together of the same material and form a one-piece optical structure.

According to other advantageous and non-limiting characteristics of the invention:

- the optical structure further includes, between the linking elements and the second elements, junction elements which are of a single piece with them,
- the second, plate-shaped, element includes a stiffening rib all along one of its longitudinal edges,
- the optical structure, between the second element and the first elements or the linking elements, includes a continuous plate which is of a single piece with these elements,
- the optical structure includes elements for fixing a printed circuit,
- the printed circuit carries the light sources,
- the light sources are light-emitting diodes,
- the light sources are essentially aligned,
- the optical structure includes means for retaining a connector associated with the printed circuit, these retaining means being of a single piece with the optical structure,
- the optical structure includes means for fixing into a housing, which are of a single piece with the optical structure, and
- the first element distributes the light onto the second element, taking account of the variations in the transmission coefficients of the first and second elements, and of the emission-pattern curve of the light source, in order to obtain an illumination at the exit from the second element which corresponds to a predetermined law.

A further subject of the present invention is a method of manufacturing an indicator lamp for a motor vehicle, the lamp comprising at least one light source and optical processing means able to straighten out the light emitted by the light sources so that it propagates in a direction essentially parallel to a general direction of emission, the optical processing means comprising, in association with each source, a first element able to distribute the light in a plane essentially perpendicular to the general direction of emission, in an essentially uniform way onto a second, generally plate-shaped element able to straighten out the incident light towards the said general direction of emission, the method comprising the stages consisting in:

establishing a law of change of the transmission coefficients of the optical processing means as a function of at least one co-ordinate on the plate in a direction perpendicular to the general direction of emission,     establishing a desired law of change of the illumination of the lamp as a function of the co-ordinate on the plate.

According to the present invention, the method further comprises the stages consisting in:

determining the emission-pattern curve of the light source and the corresponding emission law,     establishing, by combining these laws, a relationship between the orientation of a ray originating from the light source and incident on the second element and the co-ordinate on the plate,     defining the geometry of the optical processing means as a function of the said relationship,     manufacturing a mould, by using the said geometry, for at least the first element,     moulding the first element by the use of the said mould.

BRIEF DESCRIPTION OF THE DRAWINGS

Other objects, characteristics and advantages of the present invention will emerge clearly from the description which will now be given of an embodiment example, given by way of non-limiting example by reference to the attached drawings, in which.

DESCRIPTION OF THE PREFERRED EMBODIMENTS

By convention, three orthogonal directions X, Y and Z are defined, which will be used in the description and on the figures, X being the general direction of emission of the light beam by the lamp, substantially parallel to the longitudinal axis of the vehicle, Y being the horizontal direction perpendicular to X and Z the vertical direction.

In the figures, an indicator lamp has been represented, grouping together several light sources such as light-emitting diodes 10 each interacting with a lens 12 forming a spherical cap in order to distribute the light rays emitted by the diode 10 and to illuminate a transparent plate 14.

Figure 10:
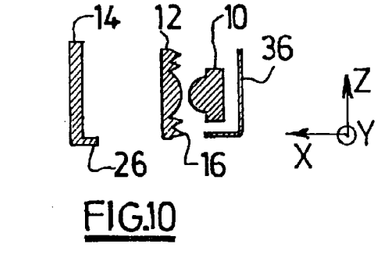
FIG. 10 represents a view in section along the line X—X of FIG. 3.

More precisely, the lens 12 includes, on its inner face, turned towards the diode 10, essentially horizontal striations 16 (FIG. 10), and essentially vertical striations 18 (FIG. 6) on its outer face. Likewise, the plate 14 includes, on its inner face, facing the lens 12, essentially vertical striations 20. In a way which is known, for example from the abovementioned documents, the striations 16, 18 and 20 ensure that the illumination originating from the plate 14 is uniform along the Y and Z directions.

This assembly is intended to be arranged in a housing (not represented) closed off by an enclosing glazing (not represented). The plate 14 may simultaneously undertake the role of enclosing glazing if it is provided on its outer face, that is to say the face furthest from the light-emitting diodes, with means for diffusing the light which passes through it, such as beads or rings formed on this outer face.

In the embodiment represented in the figures, the indicator lamp includes four light sources 10, and consequently four lenses 12.

In accordance with one aspect of the present invention, the lenses 12 are made integrally with one another and with the plate 14. To this end, provision can be made, for example, for two adjacent lenses to be linked together by intermediate walls 22, and for the end lenses to be linked to the ends of the plate 14 by end walls 24. The lenses 12, the plate 14, and the walls 22 and 24 preferably have the same dimension in the Z direction. The walls 22 and 24 may be of any shape, for example rectilinear or curved as has been represented in the figures, provided that they do not lie on the path of the light rays emerging from the lenses 12 and incident on the plate 14.

Thus a complete optical structure is obtained in a single operation, for example by moulding, including the essential optical components of the indicator lamp.

Such a design exhibits numerous advantages, including, first of all, very great ease of assembly of the indicator lamp. This is because it is sufficient simply to place this optical structure into its housing, rather than to assemble the lenses and the individual plates into this housing, in order to obtain the essential optical structure of a practically complete indicator lamp.

So as to enhance the rigidity of this optical structure, reinforcements can be provided at various places on the structure. Provision can be made, for example, as has been represented in FIGS. 3, 6, 9 and 10, to stiffen the plate 14 by forming, all along one of its longitudinal edges, a rib 26 extending in the X direction, preferably rearwards, that is to say towards the lenses 12. The plate 14 thus exhibits the shape of an angle bracket in cross section, which gives it a greater stiffness.

Figure 3:
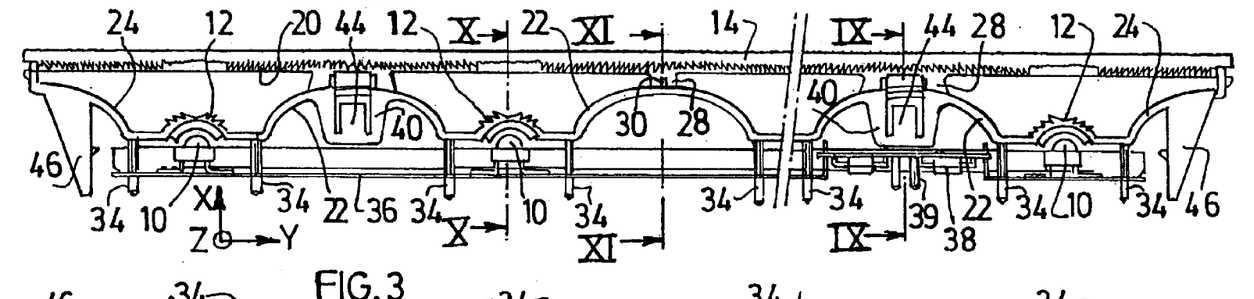
FIG. 3 represents a top view of the lamp of FIG. 1.
Figure 4:
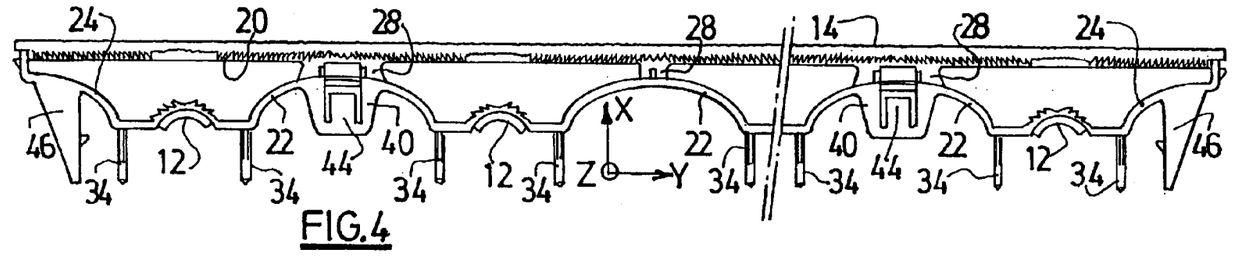
FIG. 4 represents a view similar to that of FIG. 3, the lamp being devoid of any electrical circuit.
Figure 6:
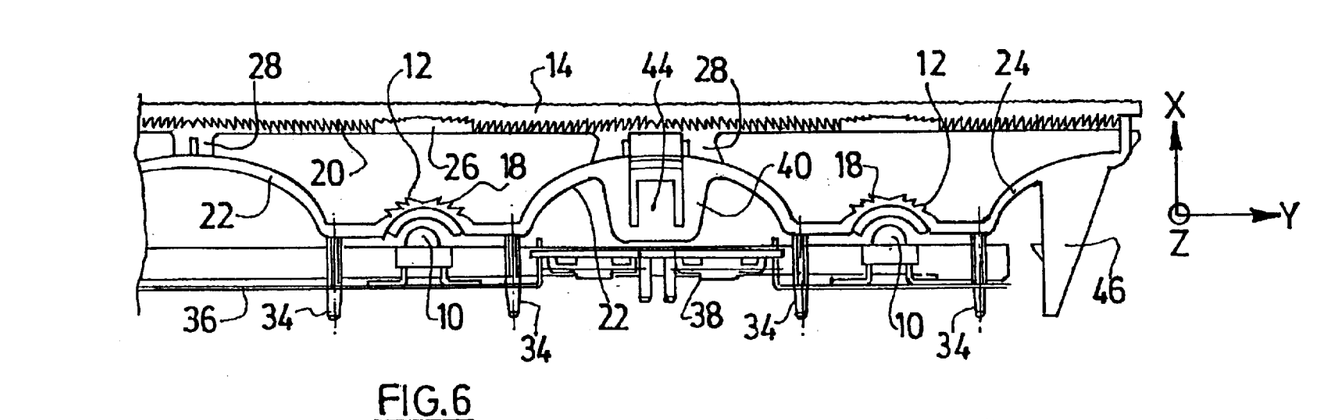
FIG. 6 represents a top view on a larger scale of one end of the lamp of FIG. 3.
Figure 11:
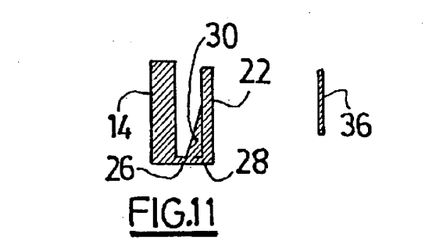
FIG. 11 represents a view in section along the line XI—XI of FIG. 3.

Provision can also be made to link the plate 14 to the intermediate walls 22, with the aid of tabs 28, advantageously situated in the extension of the rib 26, as has been represented in FIGS. 3, 4 and 6. In this way, not only is the rigidity of the optical structure enhanced, but also the relative position of the lenses 12 and of the plate 14 is fixed permanently. A corner piece 30 can also be formed between the tab 28 and the plate 14, or preferably between the tab 28 and the intermediate wall 22, as has been represented in particular in FIGS. 9 and 11, so as not to interfere with the light rays originating from the lenses 12 and incident on the plate 14. These corner pieces 30, and consequently the tabs 28 on which they are possibly formed, will advantageously be situated at equal distance from two adjacent lenses.

Figure 7:
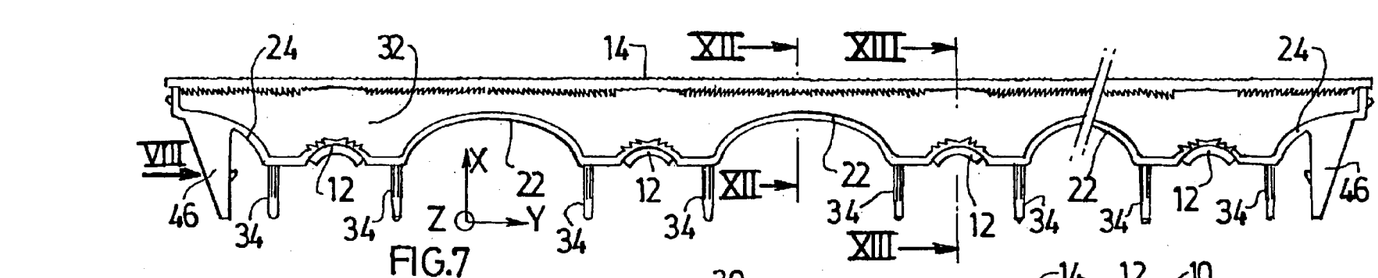
FIG. 7 represents a top view of an embodiment variant of the lamp of FIGS. 1 to 6.
Figure 8:
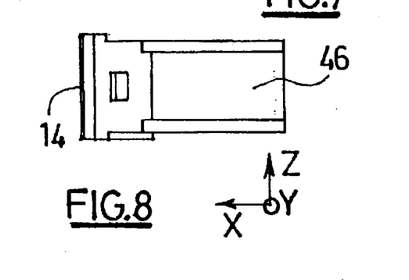
FIG. 8 represents a side view of the lamp of FIGS. 1 to 6 or of FIG. 7, seen, for example, in the direction VIII of FIGS. 5 and 7.
Figure 9:
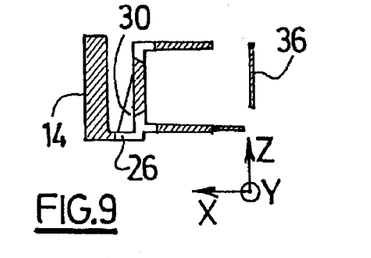
FIG. 9 represents a view in section along the line IX—IX of FIG. 3.
Figure 12:
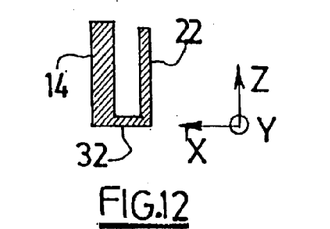
FIG. 12 represents a view in section along the line XII—XII of FIG. 7.
Figure 13:
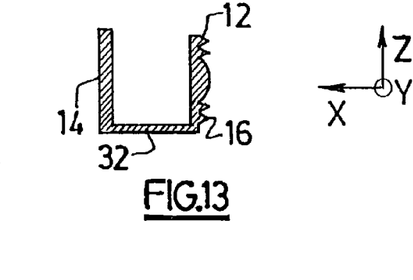
FIG. 13 represents a view in section along the line XIII—XIII of FIG. 7.

According to one embodiment variant represented in FIGS. 7, 12 and 13, provision can also be made to link the plate 14 to the lenses 12 and to the walls 22 and 24 by a continuous plateau 32, constituting the extension of the rib 26 as far as the walls 22 and 24 and to the lenses 12. According to such an embodiment, the optical structure, in cross-section, exhibits a U-shape, the spacing between the branches of the U being variable as a function of the site where the cross-section is taken. This structure thus exhibits very great rigidity. Here again, tabs may be formed between the intermediate walls 22 and the plateau 32.

Whatever the embodiment chosen for the optical structure, provision can advantageously be made to produce this structure in such a way that it is easily possible to fix the light sources, in this instance the light-emitting diodes 10, to it. This can be achieved simply according to the present invention, by providing for pins or studs 34 to be formed, extending rearwards in the X direction. These pins 34 are configured to interact with openings formed in a printed circuit 36, onto which the light-emitting diodes 10 are advantageously soldered, as well as a power-supply circuit 38 for these diodes, formed from the usual electronic components.

In this way, the assembling of the indicator lamp is further simplified, since it is sufficient to fix the printed circuit 36, which, moreover, is pre-assembled, onto the pins 34 in order to obtain a complete assembly for generating and emitting light, which it is sufficient then to place into a housing in order to obtain a complete indicator lamp. Such a solution exhibits the additional advantage that it is thus possible to arrange the light-emitting diodes accurately at a predetermined distance from the lenses 12 in order to obtain the optimal photometric performance of the indicator lamp thus assembled in a simple and reliable way.

The printed circuit 36 may comprise connecting pins 39 (FIG. 3) for establishing the link with an electric-current power supply, for example by wires soldered to these connecting pins. These wires are then soldered at one of their ends onto the connecting pins 39 before the printed circuit 36 is installed on the optical structure, and comprise a connector at their other end. In order to avoid an indicator lamp being obtained from which exits a more or less lengthy electrical wire, it may be preferred for this indicator lamp itself to have a connector.

Figure 1:
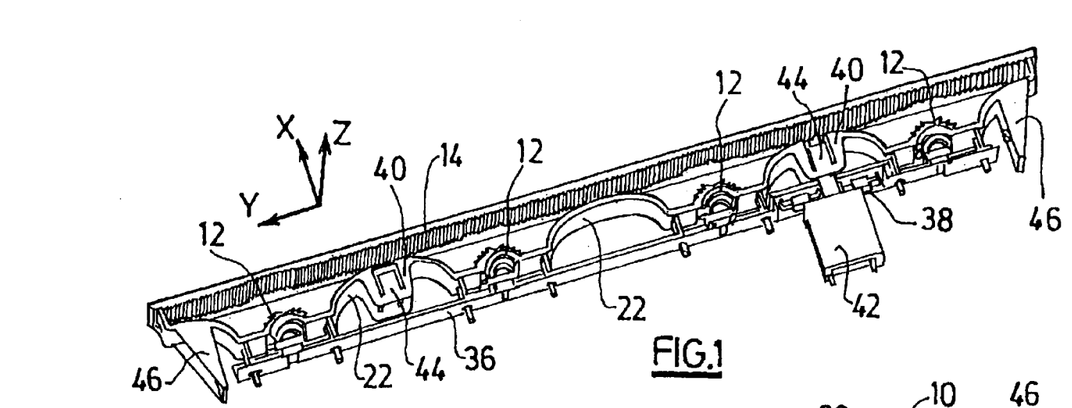
FIG. 1 represents a view in three-quarters rear perspective of an indicator lamp produced according to the present invention.
Figure 2:
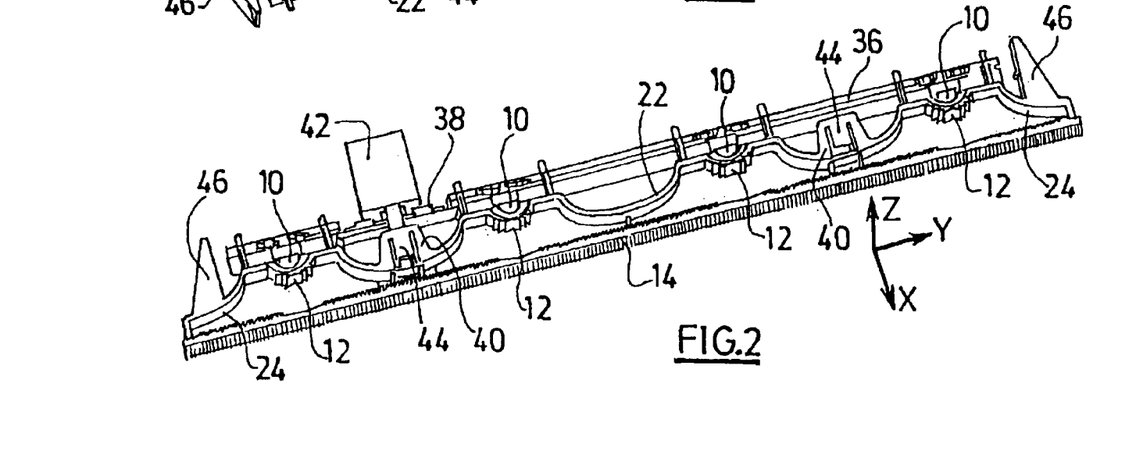
FIG. 2 represents a view in three-quarters front perspective of the indicator lamp of FIG. 1.

This can be achieved simply, by forming a pair of lugs 40 on the optical structure, which are intended, for example by clipping, to accommodate a connector 42 (FIGS. 1 and 2), for example a female connector, integral with the printed circuit 36. The lugs 40 of a pair are preferably formed from the upper and lower edges of the intermediate wall 22, while being of a single piece with it. The lugs 40 can be formed with an elastic part 44, intended to interact with clipping tabs carried by the connector 42. Thus, during assembling, it is sufficient to place the printed circuit 36 in such a way that its apertures interact with the pins 34, and that the tabs of the connector 42 clip in between the lugs 40.

The tab 28 associated with the intermediate wall 22 on which the pair of lugs 40 is formed is preferably reinforced, in order to avoid the installation of the printed circuit 36 on the optical structure or the fitting of a male connector (not represented) onto the female connector 42 exerting substantial stresses on the optical structure, stresses which could result in this structure breaking.

Figure 5:
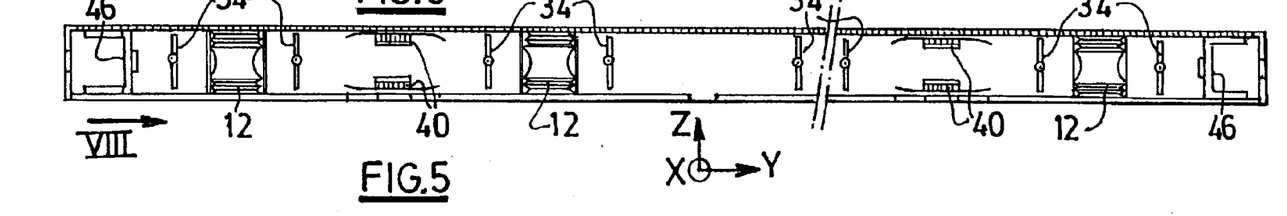
FIG. 5 represents a rear view of the lamp of FIG. 4.

The optical structure may also be formed with studs 46 intended to facilitate the installation of the optical structure in its housing, and to ensure that it is held in it. As has been represented in the figures, the studs 46 may be formed at the ends of the optical structure, for example on the end walls 24, while being of a single piece with them. As can be seen better in FIGS. 1 and 5, the studs 46 have a U-shaped cross-section, the branches of which have the shape of triangles. Any other shape of stud could be chosen, depending on the configuration of the housing intended to accommodate such an optical structure.

Thus an optical structure has been produced which includes the lenses 12 linked by intermediate walls 22, the plate 14 linked to the lenses situated at the ends by walls 24, pins 34 intended to accommodate a printed circuit 36, lugs 40 for fixing a connector and fixing studs 46, all these elements being of a single piece, and thus obtained in a single operation.

The assembling of an indicator lamp with the aid of such a structure is particularly simple. This is because it is sufficient to fix the printed circuit 36, assembled, moreover, onto the pins 34, by making the tabs of the connector 42 co-operate, if the printed circuit 36 is provided with them, with the elastic parts 44 of the lugs 40. Thus a complete assembly for generating and emitting light is obtained, which it is then possible, by virtue of the studs 46, to arrange in a housing, which it is sufficient to close off in order to obtain a complete indicator lamp. Such a series of operations can easily be automated, which further contributes to reducing the cost of the indicator lamp thus obtained.

One of the advantages of the production of an optical structure in a single piece as has just been described lies in the fact that the relative distances between the various optical components of this structure are fixed by construction, and they are invariable during the handling and the storage of this structure, the assembling of the indicator lamp, the handling, the storage of the lamp, the installation of the lamp on a motor vehicle, and in the course of the use of this lamp.

Another advantage obtained by this design lies in the fact that, in this way, it is always certain that the refractive indices of the lenses 12 and of the plate 14 will always be identical, since these components are produced from exactly the same material.

These last two characteristics have the result that the photometric performance of an indicator lamp assembled with the aid of such an optical structure will be able to be determined with great precision, since they are perfectly reproducible. Such performance will even be able to be optimised by virtue of the use of light-emitting diodes.

This is because, for an indicator lamp, a desired law is fixed for the illumination on the plate 14, in the horizontal direction, which, in the illuminating range of the lamp, determines a profile of the effective illumination leaving the plate 14 as a function of the abscissa y of a current point of this plate in the Y direction. This law is denoted $k_1(\theta)$, and it is particularly desired that the level of illumination E be essentially constant over the entire horizontal extent of the illuminating range of the indicator lamp, and consequently over the entire horizontal extent of each part of the plate 14 associated with a single lens 12, i.e.

$$k_1(\theta)=E(\theta)=1$$

Figure 14:
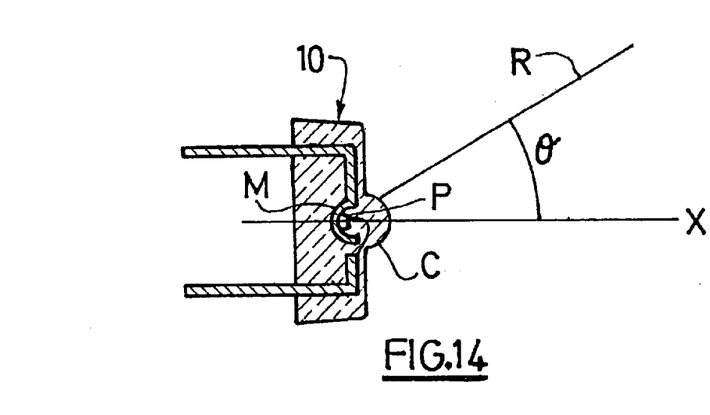
FIG. 14 represents a diagrammatic sectional view of a light-emitting diode.

Moreover, as has been represented in FIG. 14, the light-emitting diodes are optical systems consisting of a chip P generating an optical flux, of a mirror M for collecting and redirecting the flux emitted rearwards, and of a hemispherical condenser C for concentrating the flux emitted forwards. With such a construction, the diode emits a light beam which is limited in angle and the maximum brightness of which is situated in the X axis of this diode, according to an emission pattern represented in FIG. 15.

Figure 15:
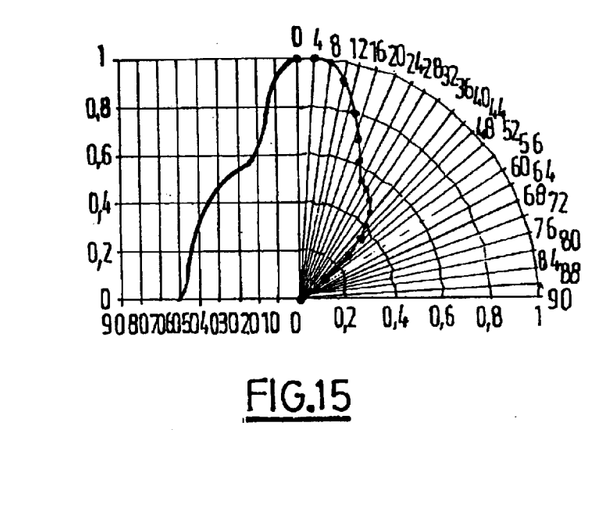
FIG. 15 represents an emission pattern of a light-emitting diode.

The left-hand half of FIG. 15 represents the half-pattern of emission of the diode 10, by plotting the values of the angular aperture on the abscissas and the values of the relative brightness of the light beam on the ordinates. The right-hand half of FIG. 15 represents an emission half-lobe in polar coordinates, by plotting, on the radii, the values of the relative brightness of the light beam, and, in angular coordinates, the values of the angular aperture of the light beam. The values indicated, expressed in candelas per degree, correspond to a horizontal cross-section of the beam on a screen perpendicular to the X axis and at a defined distance from the diode. The outline of the beam on this screen forms an axisymmetric circular spot.

In the example represented in FIG. 15, it is seen that almost the whole of the luminous flux emitted by the diode lies within a solid angle with half-angle at the vertex equal to about 60°. With the dimensions of the lens in the Z direction being given, it is easily possible to determine its position in the X direction with respect to the diodes 10 so that it picks up the whole of this luminous flux.

For a given light-emitting diode 10, it is possible to determine the emission-pattern curve, represented in FIG. 15, and which can be likened to a 12th-order polynomial function $I(\theta)$ of the form:

$$I(\theta)=a_0+a_2\theta^2+a_4\theta^4+a_6\theta^6+a_8\theta^8+a_{10}\theta^{10}+a_{12}\theta^{12}$$

where $\theta$ is the angle which a ray emitted by the light-emitting diode 10 forms with the X direction, as has been indicated in FIG. 14. A law denoted $k_2(\theta)$ stems therefrom, giving the profile of the brightness of the emission lobe of the diode, such that $$k_2(\theta)=\frac{1}{I(\theta)}$$

represents the distribution function in the calculation of the brightness for the angle $\theta$ such that:

$$E(\theta)=k_2(\theta)*I(\theta)=1$$

It was seen, moreover, that the lens 12 is formed on its inner face with striations 16, of generally circular shape, and the shape of which, in vertical cross section, corresponds to that of a cylindrical Fresnel lens. These striations 16 are able to straighten out the light rays emitted by the light-emitting diode 10 upwards and downwards in such a way that they propagate in a generally horizontal direction. These striations have no influence on the horizontal distribution of the light rays. In contrast, the striations 18 formed on the outer surface of the lens 12 ensure a horizontal distribution of the light rays in the direction of the plate 14, in such a way that the illumination from the lamp in the Y direction all along the illuminating range is constant. Finally, the striations 20 formed on the plate 14 divert the light rays originating from the lens 12 so as to direct them in a direction substantially parallel to the X direction.

A law denoted $k_3(\theta)$ results therefrom, giving the profile of the coefficients of transmission of this system as a function of the angle $\theta$ which a ray emitted by the light-emitting diode 10 makes with the X direction.

In accordance with a second aspect of the invention, account is taken of the emission pattern of the light-emitting diode 10 used, of the light-transmission properties and of the desired profile of the illumination in order to produce the law of horizontal distribution of the light by the striations 18 on the outer surface of the lens 12, according to the equation:

$$y=k_1(\theta)*k_2(\theta)*k_3(\theta)*\theta$$

where y is the abscissa of a current point of the plate 14 in the Y direction and $\theta$ the angle which a ray emitted by the light-emitting diode 10 forms with the X direction.

The distribution functions $F(\theta)$ taken into account in the calculation of the striations 18 formed on the outer surface of the lens 12 are defined and optimised as a function of the emission pattern $I(\theta)$ of the light-emitting diode used, each type of light-emitting diode having a specific emission pattern $I(\theta)$.

Knowing the emission pattern of the light-emitting diode used, it is then possible, according to the present invention, to determine the law for horizontal distribution of the light by the striations 18 of the outer surface of the lens 12, that is to say, for each value of $\theta$, the abscissa y which each light ray emitted by the particular light-emitting diode 10, once diverted by the lens 12, has to reach on the plate 14. It is thus possible, by calculation, to determine the shape of the striations 18 in order to obtain this result.

A further subject of the present invention is a method of manufacturing an indicator lamp such as it has just been described. Such a method comprises the stages consisting in:

establishing a law $k_3(\theta)$ of change of the transmission coefficients of the optical processing means 16, 18, 20 as a function of at least one co-ordinate y on the plate 14 in a direction Y perpendicular to the general direction of emission X, establishing a desired law $k_1(\theta)$ of change of the illumination of the lamp as a function of the co-ordinate y on the plate 14.

According to the present invention, the method further comprises the stages consisting in:

determining the emission-pattern curve $k_2(\theta)$ of the light source 10 and the corresponding emission law $I(\theta)$, establishing, by combining these laws, a relationship between the orientation $\theta$ of a ray originating from the light source 10 and incident on the second element 14, 20 and the co-ordinate y on the plate 14, defining the geometry of the optical processing means 16, 18, 20 as a function of the said relationship, manufacturing a mould, by using the said geometry, for at least the first element 12, 16, 18, moulding the first element 12, 16, 18 by the use of the said mould.

It was seen above that the said relationship is of the form:

$$y=k_1(\theta)*k_2(\theta)*k_3(\theta)*\theta$$

where y is the abscissa of a current point of the plate (14) in the Y direction, $k_1(\theta)$ is the desired law of change of the illumination of the lamp as a function of the co-ordinate (y) on the plate (14), $k_2(\theta)$ is the emission law ($I(\theta)$) of the light source, $k_3(\theta)$ is the law of change of the transmission coefficients, and $\theta$ is an angle which a light ray originating from the light source (10) forms with respect to the general direction of emission (X).

Yet another advantage of the present invention lies in the fact that, in this way, it is possible, under the best conditions, to use a reduced number of light-emitting diodes, for example three or four in number, whereas the indicator lamps of the prior art used a much larger number of them. In fact, the light-emitting diodes conventionally have to be grouped together electrically in series in a multiple of three or four diodes, which has led to layouts comprising up to sixty-four diodes. Such layouts, in addition to their complexity and their high cost, exhibit the drawback of a relatively high operating temperature, prejudicial to the efficiency of the diodes.

By virtue of the design of the optical structure according to the present invention, it is possible to use only a minimal number of light-emitting diodes. Such a layout of three or four diodes in series is practically insensitive to variations in power-supply voltage, and practically all the electrical energy consumed is converted into luminous flux, and very little into heat by Joule effect.

The optical structure makes it possible to produce an indicator lamp possessing a great width in the Y direction, for example of the order of 300 mm, a relatively low height in the Z direction, for example of the order of 10 mm, and a shallow depth in the X direction, for example of the order of 30 mm, the diodes being spaced by about 75 mm.

The fact of spacing the diodes makes it possible to limit the internal heating of the housing to a minimal value, which makes it possible to use the diodes in their optimal operating range. This is because the efficiency of a light-emitting diode, characterising the quantity of light emitted with respect to the electrical energy absorbed, is degraded in proportion as the temperature of the light-emitting chip rises. The invention, by spacing the diodes apart from one another, makes it possible to make the diodes work optimally, the effects of mutual heating between two contiguous diodes being reduced to a large extent. Thus it will be possible to use diodes emitting a substantial luminous flux without them undergoing a phenomenon of self-heating, and to drive them at full power at their rated voltage, without impairing their life expectancy.

It will be possible, for example, to use light-emitting diodes known by the name of SNAPLED ™, sold commercially by the company LUMILED. These diodes will then advantageously be clipped and crimped onto a metal circuit. Such a metal circuit exhibits the additional advantage of draining the heat energy generated by the diodes.

It is also possible to use surface-mounted components (SMC) as light-emitting diodes, arranging them on a conventional circuit in surface-mounting technology, and bonding metal plates onto the circuit to act as heat sinks or radiators.

Needless to say, the present invention is not limited to the embodiments which have been described, but, on the contrary, the person skilled in the art will be able to apply numerous modifications which fall within its scope. Hence, for example, the output plate could be straight, or could possess a fixed or variable radius of curvature.

What is claimed is:

1. An indicator lamp for a motor vehicle, comprising:

a plurality of light sources;

a plurality of linking elements; and optical processing means for straightening out the light emitted by the light sources so that the light is propagated in a direction essentially parallel to a general direction of emission;

wherein the optical processing means comprises a plurality of first elements, each first element corresponding to one of the plurality of light sources, and a second element;

wherein each of the first elements includes a plurality of striations, the first elements adapted to distribute the light in a plane essentially perpendicular to the general direction of emission in an essentially uniform way onto the second element;

wherein the second element is adapted to straighten out the light towards the general direction of emission;

wherein the plurality of linking elements are arranged between the first elements that are adjacent, and between the first elements and the second element, and wherein the first elements, the second element, and the linking elements are made together of the same material and form a one-piece optical structure.

2. The indicator lamp according to claim 1, further comprising, between the linking elements and the second element, junction elements which are of a single piece with the linking elements and the second element.

3. The indicator lamp according to claim 1, wherein the second element includes a longitudinal edge and a stiffening rib all along the longitudinal edge.

4. The indicator lamp according to claim 1, further comprising, between the second element and the first elements or the linking elements, a continuous plateau, which is of a single piece with the first elements, the second element, and the linking elements.

5. The indicator lamp according to claim 1, further comprising elements for fixing a printed circuit.

6. The indicator lamp according to claim 5, wherein the printed circuit carries the light source.

7. The indicator lamp according to claim 6, wherein the light sources are light-emitting diodes.

8. The indicator lamp according to claim 7, wherein the light sources are essentially aligned.

9. The indicator lamp according to claim 5, further comprising means for retaining a connector associated with the printed circuit, the retaining means being of a single piece with the first elements, the second element, and the linking elements.

10. The indicator lamp according to claim 1, further comprising means for fixing into a housing, the fixing means being of a single piece with the first elements, the second element, and the linking elements.

11. The indicator lamp according to claim 1, wherein the first elements distribute the light onto the second element, taking account of variations in the transmission coefficients of the first and second elements, and of an emission-pattern curve of the light source, in order to obtain an illumination at the exit from the second element which corresponds to a predetermined law.

12. The indicator lamp of claim 1, wherein the second element is generally plate-shaped.

13. An indicator lamp for a motor vehicle, comprising:
a plurality of light sources;
a plurality of linking elements;
a plurality of first elements, each first element corresponding to one of the plurality of light sources; and
a second element;
wherein each of the first elements includes a plurality of striations, the first elements adapted to distribute the light in a plane essentially perpendicular to a general direction of emission in an essentially uniform way onto the second element;
wherein the second element is adapted to straighten out the light towards the general direction of emission;
wherein the plurality of linking elements are arranged between the first elements that are adjacent, and between the first elements and the second element, and wherein the first elements, the second element and the linking elements are made together of the same material and form a one-piece optical structure.

14. The indicator lamp according to claim 13, further comprising, between the linking elements and the second element, junction elements which are of a single piece with the linking elements and the second element.

15. The indicator lamp according to claim 13, wherein the second element includes a longitudinal edge and a stiffening rib all along the longitudinal edge.

16. The indicator lamp according to claim 13, further comprising, between the second element and the first elements or the linking elements, a continuous plateau, which is of a single piece with the first elements, the second element, and the linking elements.

17. The indicator lamp according to claim 13, further comprising elements for fixing a printed circuit.

18. The indicator lamp according to claim 17, further comprising means for retaining a connector associated with the printed circuit the retaining means being of a single piece with the first elements, the second element, and the linking elements.

19. The indicator lamp according to claim 17, wherein the printed circuit carries the light sources.

20. The indicator lamp according to claim 19, wherein the light sources are light-emitting diodes.

21. The indicator lamp according to claim 20, wherein the light sources are essentially aligned.

22. The indicator lamp according to claim 13, further comprising means for fixing into a housing, the fixing means being of a single piece with the first elements, the second element, and the linking elements.

23. The indicator lamp according to claim 13, wherein the first elements distribute the light onto the second element, taking account of variations in the transmission coefficients of the first and second elements, and of an emission-pattern curve of the light source, in order to obtain an illumination at the exit from the second element which corresponds to a predetermined law.

24. The indicator lamp of claim 13, wherein the second element is generally plate-shaped.

* * * * *

UNITED STATES PATENT AND TRADEMARK OFFICE
CERTIFICATE OF CORRECTION

PATENT NO. : 6,783,268 B2
DATED : August 31, 2004
INVENTOR(S) : Aynie et al.

It is certified that error appears in the above-identified patent and that said Letters Patent is hereby corrected as shown below:

Title page,
Item [57], ABSTRACT,
Line 7, "East first" should be -- Each first --.

Column 10,
Line 45, "source" should be -- sources --.

Signed and Sealed this

First Day of February, 2005

JON W. DUDAS
*Director of the United States Patent and Trademark Office*